(12) United States Patent
Dean

(10) Patent No.: US 12,270,431 B2
(45) Date of Patent: Apr. 8, 2025

(54) DEVICE FOR PREVENTING BRUISING IN LIVESTOCK

(71) Applicant: William Dean, New Castle, PA (US)

(72) Inventor: William Dean, New Castle, PA (US)

(*) Notice: Subject to any disclaimer, the term of this patent is extended or adjusted under 35 U.S.C. 154(b) by 227 days.

(21) Appl. No.: 17/887,778

(22) Filed: Aug. 15, 2022

(65) Prior Publication Data

US 2023/0046434 A1    Feb. 16, 2023

Related U.S. Application Data

(60) Provisional application No. 63/233,091, filed on Aug. 13, 2021.

(51) Int. Cl.
*A01K 29/00* (2006.01)
*F16C 13/00* (2006.01)

(52) U.S. Cl.
CPC .............. *F16C 13/00* (2013.01); *A01K 29/00* (2013.01)

(58) Field of Classification Search
CPC ...... A01K 1/00; A01K 1/0017; A01K 1/0023; A01K 1/0029; A01K 1/0035; A01K 1/0613; A01K 1/062; A01K 1/0088; A01K 1/0094; A01K 1/12; A01K 1/123; A01K 3/00; A01K 3/001; A01K 13/004; A01K 13/00; B60P 3/04; B65G 39/04; B65G 39/10; B65G 39/12; B65G 39/18; B65H 5/062; E06B 3/88; B61D 3/163; F16C 13/028; F16C 13/026
USPC ............ 492/39, 16, 4, 5; 410/119; 119/524, 119/843, 502, 751, 840
See application file for complete search history.

(56) References Cited

U.S. PATENT DOCUMENTS

| | | | | |
|---|---|---|---|---|
| 776,000 A | * | 11/1904 | Turner | F16C 13/028 492/55 |
| 4,055,148 A | * | 10/1977 | Brockman | A01K 1/0613 119/723 |
| 4,813,379 A | * | 3/1989 | Harmsen | A01K 1/0017 119/840 |
| 5,174,240 A | * | 12/1992 | Darvill | B60P 3/04 119/840 |
| 5,441,016 A | * | 8/1995 | Ricketts | A01K 1/0613 119/723 |
| 5,471,859 A | * | 12/1995 | Sendzimir | B21B 27/03 72/241.4 |
| 5,950,562 A | | 9/1999 | Schulte et al. | |

(Continued)

FOREIGN PATENT DOCUMENTS

| CN | 203748420 U | * | 8/2014 |
|---|---|---|---|
| CN | 108496843 A | * | 9/2018 |

(Continued)

*Primary Examiner* — Joshua D Huson
*Assistant Examiner* — Brook Victoria Schmid
(74) *Attorney, Agent, or Firm* — The Webb Law Firm

(57) ABSTRACT

A roller assembly for preventing bruising in livestock includes a central shaft having a longitudinal axis, a plurality of resilient rollers rotatable about the longitudinal axis, an end bracket rotatably connected to a first end of the central shaft, and an intermediate bracket connected to the central shaft between two of the resilient rollers. The end bracket extends from the central shaft and is configured for attachment to a structure such that the plurality of resilient rollers extends into or is tangent to a passageway defined by the structure.

14 Claims, 11 Drawing Sheets

(56) References Cited

U.S. PATENT DOCUMENTS

| | | | | |
|---|---|---|---|---|
| 5,979,365 | A * | 11/1999 | Sorraghan | A01K 1/0023 |
| | | | | 119/524 |
| 6,239,711 | B1 * | 5/2001 | Downey | A01K 1/0613 |
| | | | | 340/693.1 |
| 6,886,494 | B2 | 5/2005 | Labrecque et al. | |
| 7,213,539 | B1 * | 5/2007 | Mollhagen | A01K 1/0029 |
| | | | | 119/843 |
| 8,443,759 | B2 | 5/2013 | Nagely | |
| 8,651,050 | B2 * | 2/2014 | Rousseau | A01K 15/00 |
| | | | | 119/519 |
| 2008/0163819 | A1 * | 7/2008 | Sensenig | A01K 1/0017 |
| | | | | 119/518 |
| 2009/0282757 | A1 * | 11/2009 | Ferguson | A01K 1/0094 |
| | | | | 52/202 |
| 2010/0300373 | A1 * | 12/2010 | Kell | B60P 3/04 |
| | | | | 119/512 |
| 2011/0132277 | A1 * | 6/2011 | McAtamney | A01K 1/0272 |
| | | | | 119/752 |

FOREIGN PATENT DOCUMENTS

| | | | | |
|---|---|---|---|---|
| DE | 202012010707 U1 * | 1/2013 | | |
| EP | 2322034 A1 * | 5/2011 | | A01K 13/004 |

\* cited by examiner

DEVICE FOR PREVENTING BRUISING IN LIVESTOCK

CROSS REFERENCE TO RELATED APPLICATION

The present disclosure claims the benefit of U.S. Provisional Patent Application No. 63/233,091, filed Aug. 13, 2021, the disclosure of which is hereby incorporated by reference in its entirety.

BACKGROUND

Field

The present disclosure generally relates to devices and systems for reducing pre-harvest tissue damage in livestock.

Description of the Related Art

Pre-harvest bruising may be generally defined as tissue damage that occurs in livestock in the several days prior to harvest which renders the damaged tissue unsuitable for consumption. The damaged tissue can thus not be sold. Pre-harvest bruising is a quantifiable financial loss that costs the livestock industry tens of millions of dollars annually. By some estimates, pre-harvest bruising is a thirty-four-million-dollar annual loss to the livestock industry annually, and a twenty-three-million-dollar annual loss to the beef industry, alone.

Pre-harvest bruising often occurs as the livestock are sorted, moved, and loaded onto trailers for transport as livestock impact various structures such as fencing, gates, corridors, etc. Pre-harvest bruising typically occurs as a consequence of stress on the livestock during the sorting, moving, and transporting process. During these processes, livestock may be separated from their familiar group/flock/herd; transported to new facilities; co-mingled with unfamiliar animals of the same or different species; and subjected to unfamiliar sights, sounds, and smells. All of these stressors have the potential to induce behavioral responses, such as a "flight or fight" response, thrashing, and generally unpredictable movement that result in livestock colliding with their surroundings and one another. In the case of large, strong livestock such as cattle, such collisions can easily result in tissue injury. These problems may be exacerbated by inadequately trained handlers and general unconcern for the welfare of the animals.

Tissue damage is the precursor to bruising which may have no external signs as the damage is subcutaneous (i.e. under the skin). Depending on the severity of tissue damage, a bruise may manifest into an abscess, which could still be evident after the abscess has been healed or absorbed by the body. Regarding consumer health and food safety, the extent of tissue damage is only evident at the time of harvest. A fresh bruise or any evidence of tissue damage must be hand trimmed and discarded so as to not enter the human food chain.

Potential tissue damage may be observed as acute swelling, a change in an animal's mobility, or a change in an animal's behavioral characteristics such as depression. These changes can in turn affect animal health and wellness by restricting mobility to consume nutrition in feed, forage, and potentially the uptake of water. All of these factors result in decreased performance and production, and/or negatively effecting an animal's ability to efficiently raise its offspring. Accurately quantifying these (sometimes indirect) financial implications is nearly impossible to do as loss in production or performance is often immeasurable and tied to an increase in time of the responsible daily management's labor, and relative overhead of the animal production sector of the industry.

Sites that result in potential tissue damage within livestock facilities include substantially any structure through which livestock are moved or held, such as livestock entering or struggling in a working chute. other structures and/or sites where livestock are susceptible to tissue damage include: holding/stack alleys (a narrow alley holding livestock single file prior to a working chute or loadout chute); sorting alleys (similar to a holding alley, but connects to multiple pens or alley ways); loadout pens (a pen used for loading without any provisions to have livestock move in a single file manner); and funnel pens (a pen that gradually narrows so livestock progress single file, typically attached to a holding alley).

An at least partial solution to the problem of pre-harvest bruising is to reduce the stress experienced by the livestock through improved handling procedures. This solution is typically grounded in an understanding of animal behavior and social characteristics. Examples of practices that have been shown to effectively reduce livestock stress include the use of sweeping curves rather than sharp corners in alleys through which livestock are transported, solid walls that limit the livestock's ability to see other areas of a facility, and avoidance of harsh changes in lighting and grade of the ground. While such changes to existing practices are an important component in reducing livestock stress that ultimately leads to pre-harvest bruising, contact with obstructions is essentially inevitable during loading of livestock onto trailers.

Livestock are typically transported to the harvest site in trailers having a rear rollup door. The door of most commercially available trailers is between 32" and 36" in width. Shortly after entering the trailer, livestock must descend a ramp to enter the lower level. In such close quarters, some impacts with the doorframe and/or the structure above the ramp are essentially inevitable, especially for large livestock such as cattle.

SUMMARY

In view of the foregoing, there exists a need for devices and systems for preventing pre-harvest bruising in livestock. In some non-limiting embodiments, the present disclosure is particularly directed to devices and systems for use in livestock trailers. In some non-limiting embodiments, the present disclosure is directed to a roller assembly for preventing bruising in livestock. The assembly includes a central shaft having a longitudinal axis, a plurality of resilient rollers rotatable about the longitudinal axis, an end bracket rotatably connected to a first end of the central shaft, and an intermediate bracket connected to the central shaft between two of the resilient rollers. The end bracket extends from the central shaft and is configured for attachment to a structure such that the plurality of resilient rollers extends into or is tangent to a passageway defined by the structure.

In some embodiments, each of the resilient rollers includes a pneumatic bladder.

In some embodiments, each of the pneumatic bladders is mounted to at least one flange connected to the central shaft.

In some embodiments, each of the plurality of pneumatic bladders receives pressurized air from a bore extending parallel to the longitudinal axis.

In some embodiments, the plurality of resilient rollers are rotationally locked relative to one another so as to rotate in unison.

In some embodiments, the central shaft includes a plurality of segments, each of the plurality of segments connected to at least one of the plurality of resilient rollers.

In some embodiments, each of the plurality of segments includes an interface for reversibly attaching to an adjacent segment.

In some embodiments, the interface includes at least one of a spline, a key, and a keyway.

In some embodiments, the longitudinal axis extends substantially vertically.

Other embodiments of the present disclosure are directed to a system for moving or transporting livestock. The system includes a structure including a mounting surface and a roller assembly configured for preventing impact of livestock with the structure. The roller assembly includes a central shaft having a longitudinal axis, at least one resilient roller rotatable about the longitudinal axis, an end bracket rotatably connected to a first end of the central shaft, and an intermediate bracket connected to the central shaft between two of the resilient rollers. The end bracket extends from the central shaft and is configured for attachment to a structure such that the plurality of resilient rollers extends into or is tangent to a passageway defined by the structure.

In some embodiments, the mounting surface includes a track, and the bracket assembly is adjustable along the track to adjust a position of the roller assembly relative to the structure.

In some embodiments, the at least one resilient roller includes a plurality of resilient rollers.

In some embodiments, each of the plurality of resilient rollers includes a pneumatic bladder.

In some embodiments, each of the plurality of pneumatic receives pressurized air from a bore extending parallel to the longitudinal axis.

In some embodiments, the plurality of resilient rollers are rotationally locked relative to one another so as to rotate in unison.

In some embodiments, the central shaft includes a plurality of segments, each of the plurality of segments connected to at least one of the plurality of resilient rollers.

Other embodiments of the present disclosure are directed to a trailer for transporting livestock. The trailer includes a doorframe and a doorframe roller assembly configured for preventing impact of livestock with the doorframe. The doorframe roller assembly includes a central shaft having a longitudinal axis, at least one resilient roller rotatable about the longitudinal axis, and an end bracket rotatably connected to a first end of the central shaft. The end bracket extends from the central shaft and is attached to the doorframe such that the at least one resilient roller extends into or is tangent to a passageway defined by the doorframe.

In some embodiments, the trailer further includes a horizontal member, an overhead roller assembly configured for preventing impact of livestock with the horizontal member. The overhead roller assembly includes a central shaft having a longitudinal axis, at least one resilient roller rotatable about the longitudinal axis, and an end bracket rotatably connected to a first end of the central shaft. The end bracket extends from the central shaft and is attached to the horizontal member such that the at least one resilient roller extends into or is tangent to a passageway defined by the horizontal member.

In some embodiments, the at least one resilient roller includes a plurality of resilient rollers.

In some embodiments, the plurality of resilient rollers are rotationally locked relative to one another so as to rotate in unison.

Further details and advantages of the present disclosure will be understood from the following detailed description read in conjunction with the accompanying drawings.

DETAILED DESCRIPTION

Figure 1:
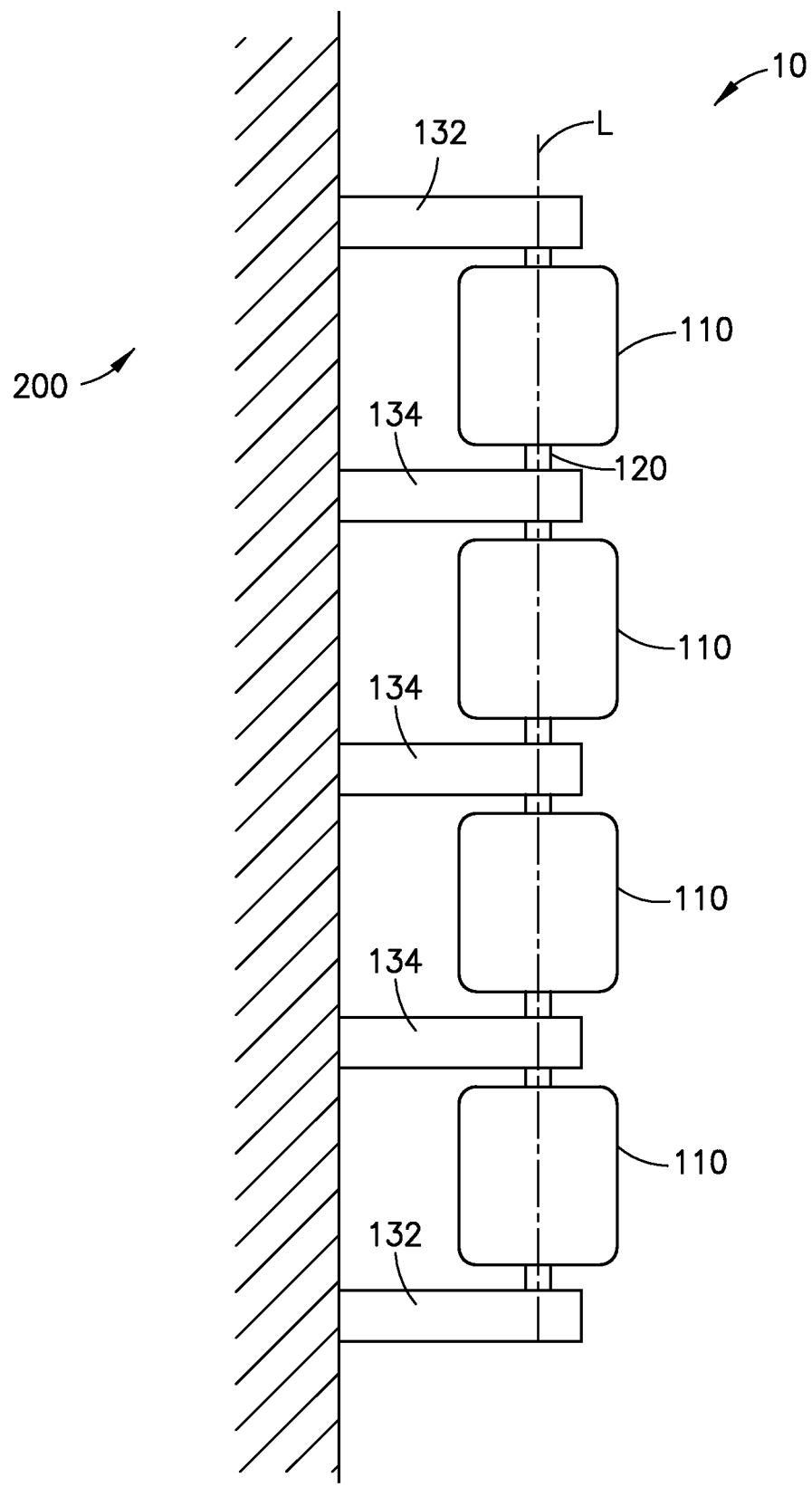
FIG. 1 is a side view of a roller assembly in accordance with embodiments of the present disclosure.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

All numbers used in the specification and claims are to be understood as being modified in all instances by the term "about". The terms "approximately", "about", and "substantially" mean a range of plus or minus ten percent of the stated value. Ranges of values are to be understood as being inclusive unless specified to the contrary.

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

Referring now to accompanying FIGS. 1-15, embodiments of the present disclosure are generally directed to a roller assembly 10. In some embodiments, the roller assembly 10 may be particularly adapted for use in livestock moving, handling, and transport applications. In particular, the roller assembly 10 may be connected to or placed in proximity to an obstruction, such as a wall or doorframe, to prevent tissue damage due to impacts of livestock against the obstruction.

Figure 2:
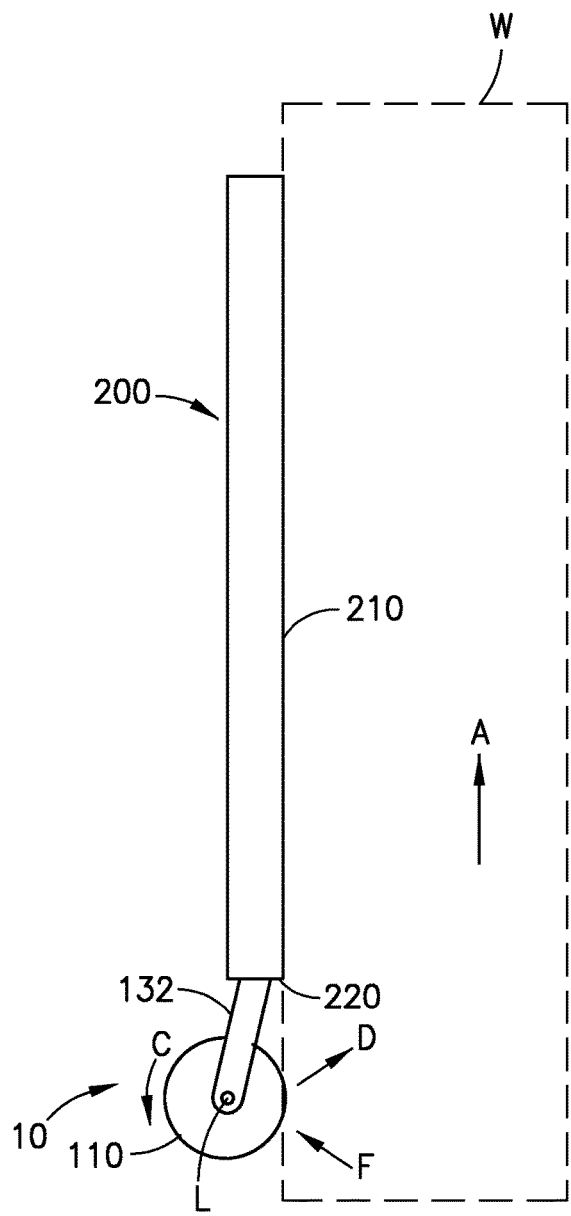
FIG. 2 is a top view of a roller assembly in accordance with embodiments of the present disclosure.
Figure 3:
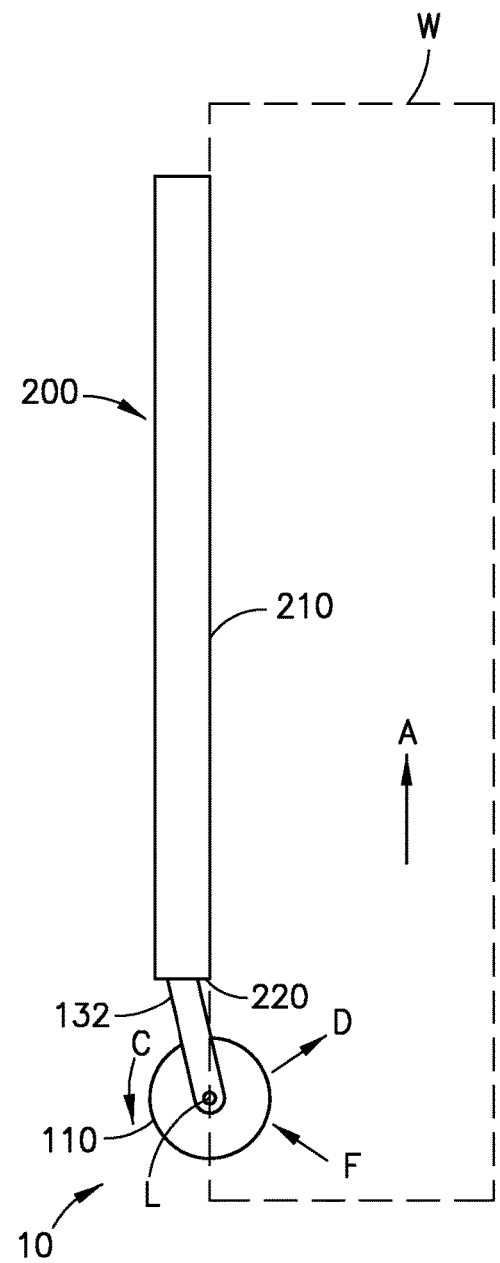
FIG. 3 is a top view of a roller assembly in accordance with embodiments of the present disclosure.
Figure 9:
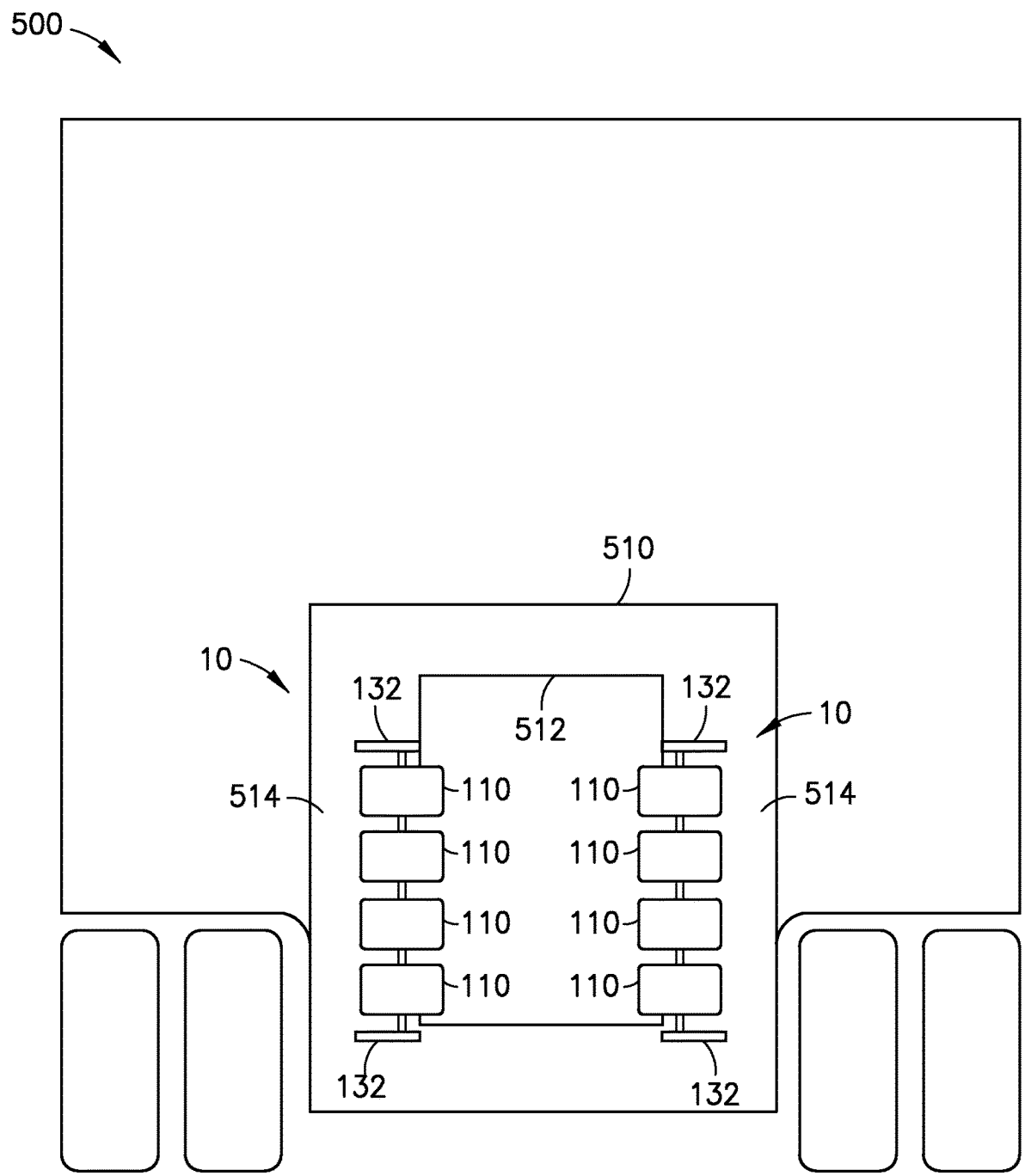
FIG. 9 is a rear view of a livestock trailer in accordance with embodiments of the present disclosure.

Referring first to FIGS. 1-3, the roller assembly 10 may include at least one roller 110 arranged on a central shaft 120. The central shaft 120 may have a longitudinal axis L about which the central shaft 120 and/or the at least one roller 110 may rotate. Each of the at least one rollers 110 may be have a substantially circular cross-section and, in some embodiments, may be generally cylindrical, spherical, bulbous, or elliptical. The roller assembly 10 may further include a bracket assembly including an end bracket 132 extending from each end of the central shaft 120 and attachable to a structure 200, such as a wall or doorframe 512 (as shown in FIG. 9), a chute (e.g. a squeeze, loadout, or working chute), alley (e.g. a holding or sorting alley), pen (e.g. a lockout pen or funnel pen), or the like. In a similar manner, an intermediate bracket 134 may be located between one or more of the rollers 110 for attachment to the structure 200. A bearing may be disposed at the connection points between the central shaft 120 and each of the brackets 132, 134 to facilitate rotation of the central shaft 120 and the at least one roller 110 relative to the brackets 132, 134. The central shaft 120 and the at least one roller 110 may be free-spinning, such that an applied force of sufficient magnitude causes the at least one roller 110 to rotate about the longitudinal axis L. The central shaft 120 and the at least one roller 110 may be rotatable in both directions (i.e. clockwise and counterclockwise) about the longitudinal axis L.

Each of the at least one rollers 110 may be resilient, meaning a force applied to the roller 110 may cause the roller 110 to temporarily deform or change shape and subsequently return to its natural shape. As such, the at least one roller 110 may act as a cushion, bumper, and/or shock absorber. Further, due to the resilient characteristics of the rollers 110, a load applied to the roller 110 is distributed across the surface of the roller 110. The stiffness, i.e. resistance to deformation, of the at least one roller 110 may be optimized to a desired value by selecting a particular thickness and/or durometer of material forming the at least one roller 110. In some embodiments, each of the at least one rollers 110 may include a pneumatic bladder filled with a pressurized gas such as air, nitrogen, or the like. The stiffness, i.e. resistance to deformation, of the at least one roller 110 may be optimized to a desired value by adjusting the gas pressure within the at least one roller 110. In some embodiments, the at least one roller 110 may be filled with a reversibly deformable foam rather than pressurized gas.

It is to be understood that the various components of the roller assembly 10 may be made in any size depending on the desired application. For example, the rollers 110 may have a diameter of approximately 4 inches (approximately 10 centimeters) and a length of approximately 12 inches (approximately 30 centimeters) in non-limiting embodiments.

In some embodiments, one or more of the rollers 110 may be rotationally locked to one another such that the rotationally locked rollers 110 rotate in unison. That is, if a force is applied to one of the rotationally locked rollers 110 causing that roller 110 to rotate in a direction, all of the rotationally locked rollers 110 rotate in the same direction at the same velocity. In some embodiments, one or more of the rollers 110 may be free-spinning relative to one another.

With continued reference to FIGS. 2 and 3, the roller assembly 10 may by connected to the structure 200 such that the at least one roller 110 extends into or is tangent to a passageway W defined by the structure 200. In some embodiments shown in FIG. 2, the roller assembly 10 may be located such that an outer circumference of the at least one roller 110 is tangent to the passageway W adjacent to a surface 210 of the structure 200. In some embodiments, as shown in FIG. 3, the roller assembly 10 may be located such that an outer circumference of the at least one roller 110 extends into the passageway W adjacent to the surface 210 of the structure 200. In either of the arrangements shown in FIGS. 2 and 3, the roller assembly 10 prevents moving bodies, e.g. livestock or humans, from impacting an end face 220 of the structure 200. The roller assembly 10 may be used in a system such as a livestock trailer 500, as will be described herein with reference to FIGS. 9 and 10, to prevent or reduce pre-harvest bruising as frightened and/or agitated livestock are guided through the passageway W. As livestock are guided along the passageway W in a moving direction A alongside the structure 200, some animals may attempt to retreat or bolt in all manner of directions. This physiological response can lead to the animal contacting surrounding obstructions, such as the end face 220 of the structure 200, with sufficient force to cause tissue damage to the animal. The arrangements of the roller assembly 10 shown in FIGS. 2 and 3 may prevent the animal from directly impacting the end face 220 of the structure 200, and may further divert the animal back into the intended moving direction A in the passageway W. If a bolting animal approaches the structure 200 in an approach direction F, the animal contacts the at least one roller 110 of the roller assembly 10. The force of impact causes the at least one roller 110 to rotate in the direction C, in turn diverting the animal back towards the center of the passageway W in the direction D. The at least one roller 110 also cushions the impact force to prevent bruising of the animal.

Figure 4:
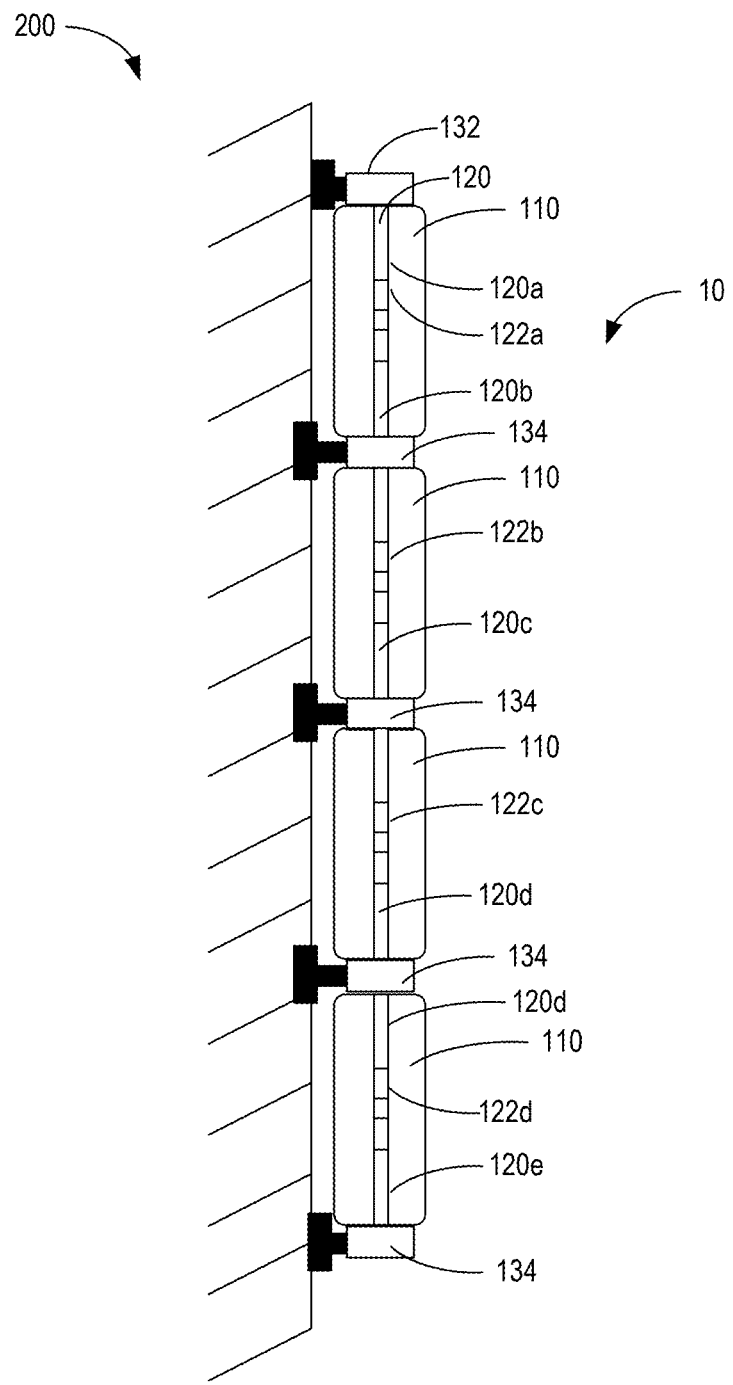
FIG. 4 is a schematic side view of a roller assembly in accordance with embodiments of the present disclosure.

Referring now to FIG. 4, the central shaft 120 may be segmented to facilitate installation and to allow replacement of individual rollers 110. In some embodiments, the central shaft 120 may include a plurality of segments 120a, 120b, 120c, 120d, 120e each associated with one or more of the rollers 110. In this arrangement, if one of the rollers 110 is damaged, the damaged roller 110 and its associated shaft segment(s) 120a-120e can be replaced without replacing the entire roller assembly 10. Each of the segments 120a-120e may include at least one interface for connecting to any adjacent segments 120a-120e. For example, an end segment 120a may include an internal spline allowing for a slip fit connection with an external spline of a shaft connector 122a. The shaft connector 122a may, in a similar manner, have a second external spline for a slip fit connection with an internal spline of the adjacent segment 120b. The shaft connector 122a thus rotationally locks the end segment 120a to the adjacent segment 120b, causing the rollers associated with the end segment 120*a* and the adjacent segment 120*b* to be rotationally locked relative to one another and thus rotate in unison. In a similar manner, the remaining segments 120*c*-120*e* may be interconnected with the associated shaft connectors 122*b*, 122*c*, 122*d*, as evident from FIG. 4. As will be shown in FIGS. 5 and 6, the end shaft segments 120*a*, 120*e* may be of different construction than the intermediate shaft segments 120*b*-120*d* in order to interface with the end brackets 132.

While the connection between the segments 120*a*-120*e* and the shaft connectors 122*a*-122*d* has been described as a splined connection, one skilled in the art will appreciate that other mechanical connections may be used. For example, the segments 120*a*-120*e* may include a keyway for engagement with corresponding keys in the shaft connectors 122*a*-122*d*, or vice versa. Additionally, the connection between the segments 120*a*-120*e* and the shaft connectors 122*a*-122*d* may include pins, set screws, clips, or the like to prevent relative movement between the segments 120*a*-120*e* and the shaft connectors 122*a*-122*d* along the longitudinal axis L (see FIG. 1).

To replace or service a roller 110 on any of the segments 120*a*-120*e* of the central shaft 120, one or more brackets 132, 134 may be at least partially removed from the central shaft 120 and the connected structure 200. In the case of the intermediate brackets 134, only a cap 324 (see FIGS. 14-15) may need to remove to access the shaft segment connected thereto. The individual segments 120*a*-120*e* associated with the roller 110 being serviced may then be disconnected from the remaining segment 120*a*-120*e* so that the roller 110 can be accessed. The remaining segments 120*a*-120*e* can be reassembled with a replacement segment including an undamaged roller 110 added. The brackets 132, 134 may then be re-attached and the roller assembly reconnected to the structure 200.

While the embodiment shown in FIG. 4 includes 4 rollers 110 and a corresponding number of shaft segments 120*a*-120*e*, shaft connectors 122*a*-122*d*, and intermediate brackets 134, more or less rollers 110 may readily be used due to the modular construction of the roller assembly 10. For each additional roller 110, an additional segment, connector shaft, and intermediate bracket would be needed. Conversely, to reduce the number of rollers 110 by one, one less segment, connector shaft, and intermediate bracket would be needed.

Figure 5:
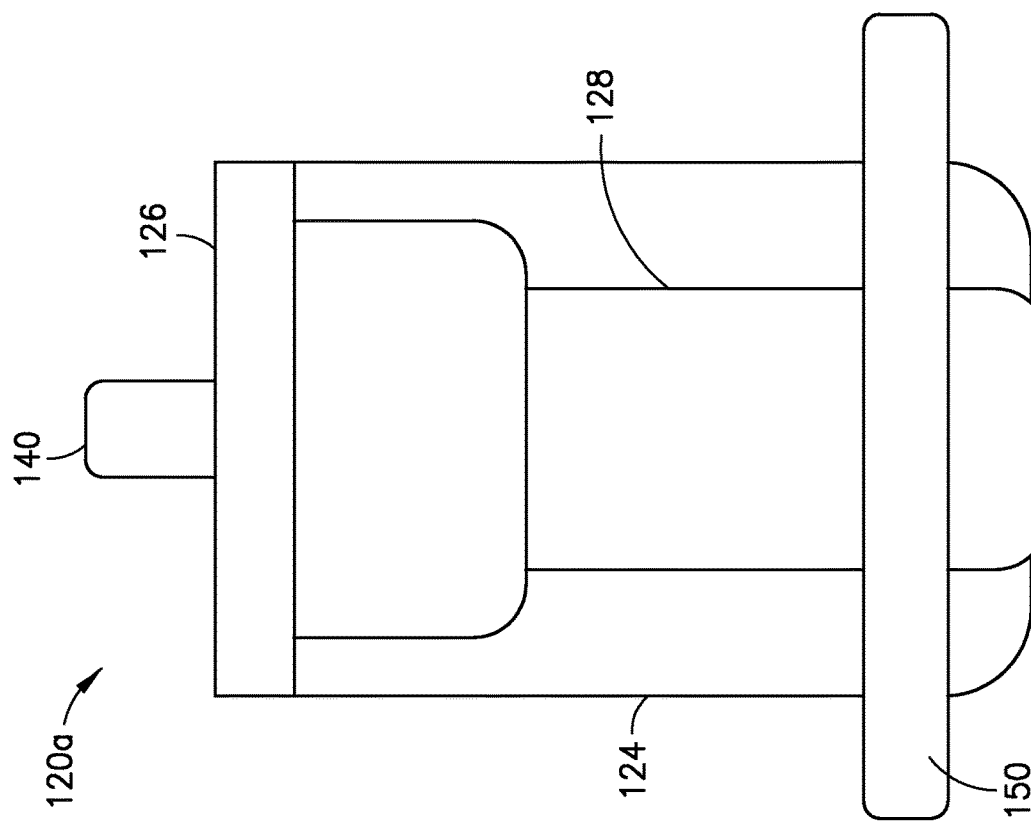
FIG. 5 is a schematic side view of an end hub of the roller assembly of FIG. 4.

Referring now to FIG. 5, the end shaft segment 120*a* is illustrated detached from the remaining shaft segments 120*b*-120*e*. The end segment 120*a* includes a hollow tube 124 having an internal spline 128, or other suitable connecting structure as described herein. An end of the tube 124 is closed by an end cap 126 which includes an air inlet port 140, e.g. a Schrader valve. A gas (e.g. air, nitrogen, or the like) may be supplied through the air inlet port 140 to pressurize the rollers 110 (as shown in FIGS. 1-4). The hollow tube 124 rotatably mounts to the bearing 402 of the bracket 132 (see FIG. 13) in a manner that allows the air inlet port 140 to be accessed via an orifice of the end bracket 132. A flange 150 is rigidly connected to the tube 124 and provides a mounting interface to the rollers 110. In particular, the flange 150 may include a surface for receiving a bead of the roller 110 to create an air-tight connection between the roller 110 and the segment 120*a*. The shaft segment 120*a* may be substantially similar or identical to the segment 120*e* at the opposite end of the shaft 120, although the end segments 120*a*, 120*e* may be oriented as mirror images of one another when the shaft 120 is assembled.

Figure 6:
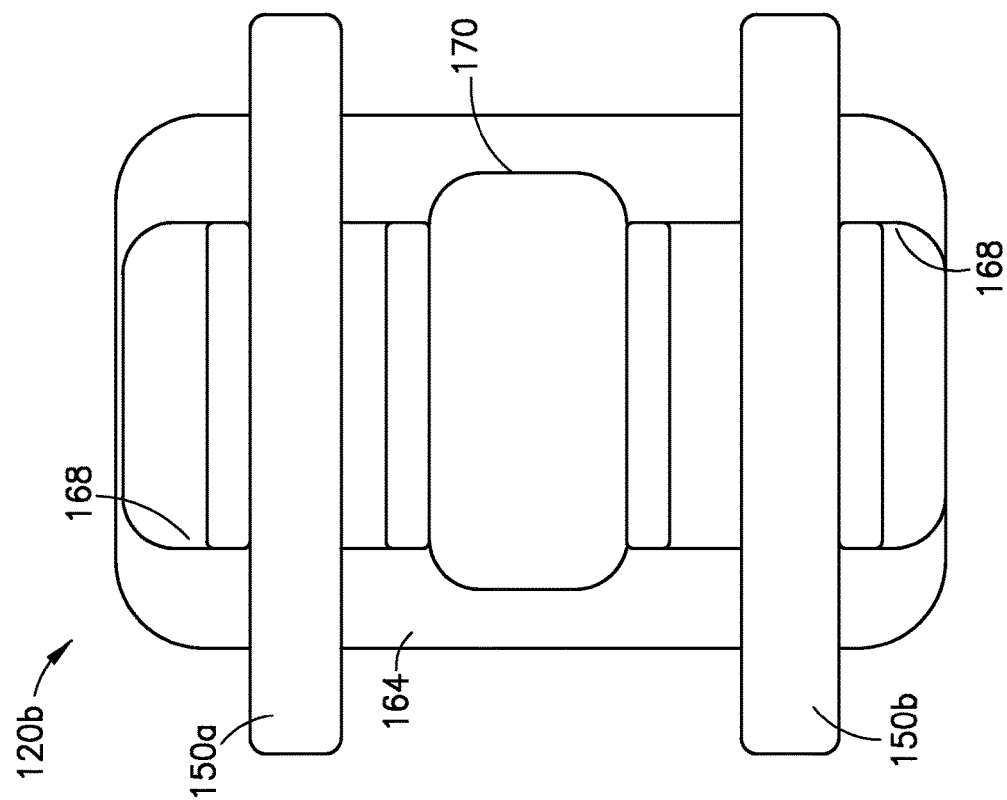
FIG. 6 is a schematic side view of an intermediate hub of the roller assembly of FIG. 4.
Figure 14:
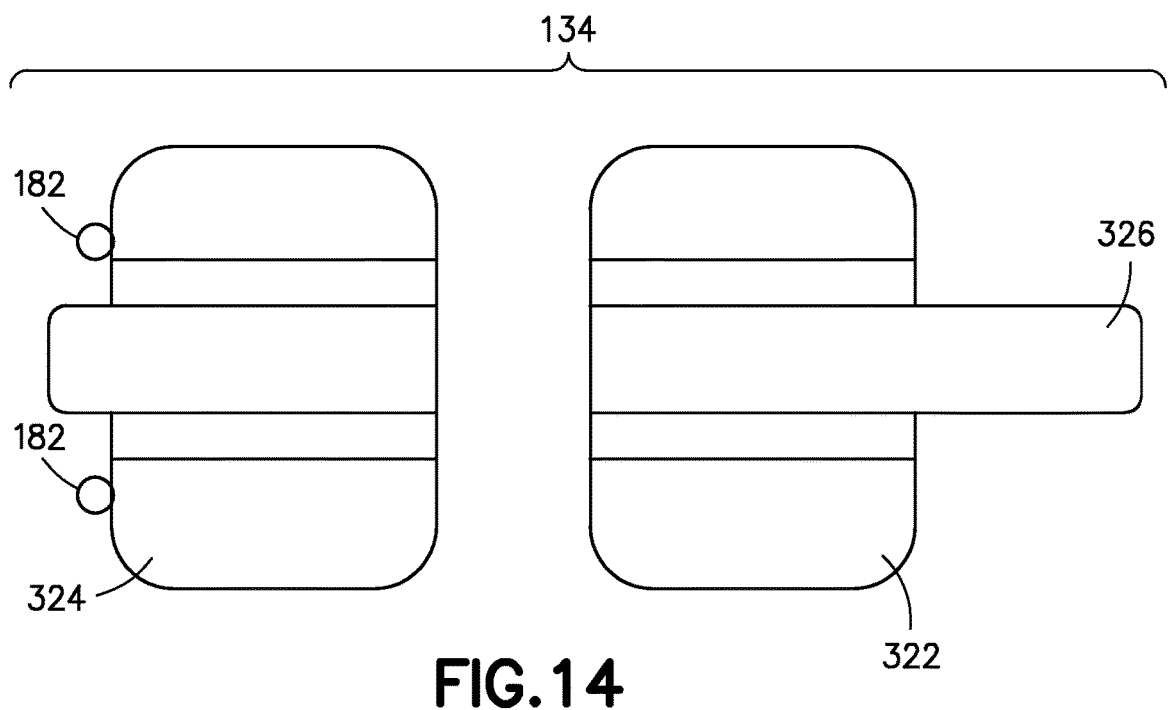
FIG. 14 is an exploded side view of an intermediate bracket of the roller assembly of FIG. 4.
Figure 15:
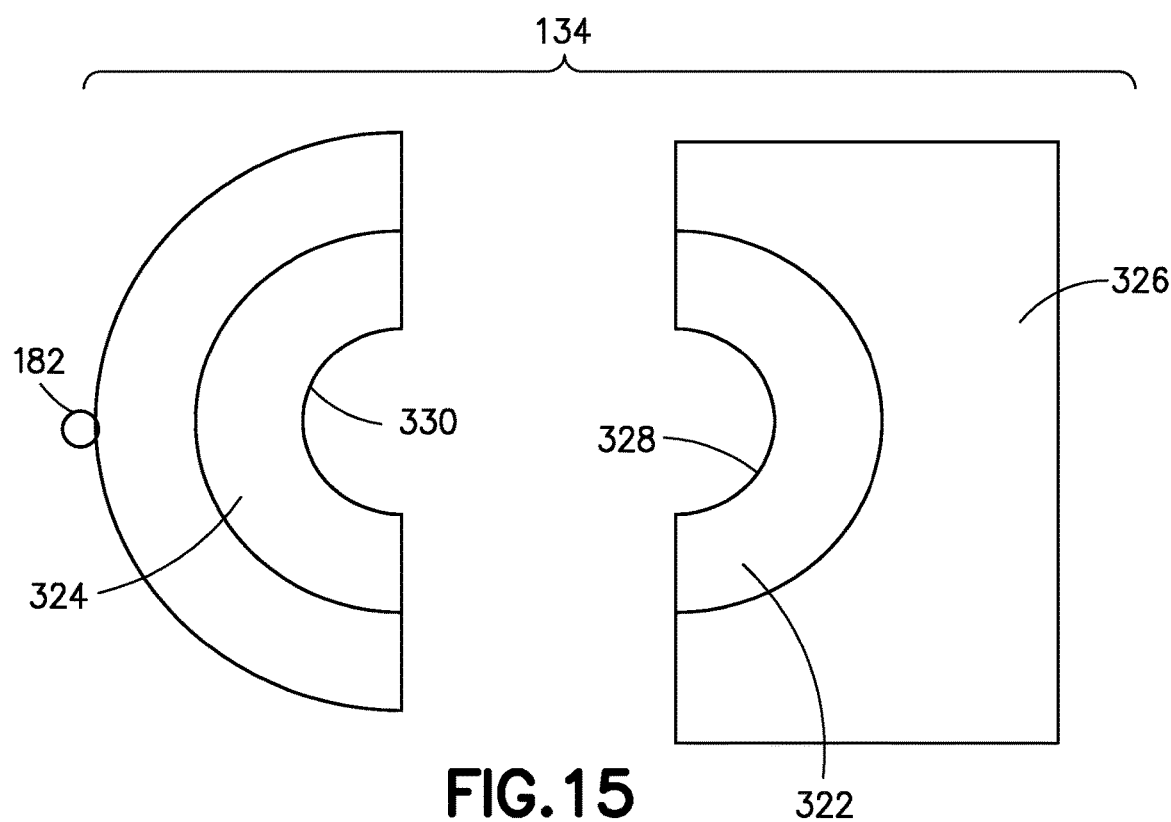
FIG. 15 is an exploded top view of the end bracket of FIG. 14.

Referring now to FIG. 6, the intermediate segment 120*b* is illustrated detached from the remaining shaft segments 120*a*, 120*c*, 120*d*, 120*e*. The intermediate segment 120*b* includes a hollow tube 164 having an internal spline 168, or other suitable connecting structure as described herein. Both ends of the hollow tube 164 are open to allow connection to adjacent segments 120*a*, 120*c* of the shaft 120 via shaft connectors 122*a*, 122*b*. The open ends of the hollow tube 164 also allow air supplied to the end segment 120*a* to flow into and through the intermediate segment 120*b*. A pair of flanges 150*a*, 150*b* is rigidly connected to the tube 164 and provides a mounting interface to the rollers 110. In particular, the flanges 150*a*, 150*b* may each include a surface for receiving a bead of associated rollers 110 to create an air-tight connection between the rollers 110 and the segment 120*b*. The hollow tube 164, particularly the region between the flanges 150*a*, 150*b*, rotatably mounts to the bearing surfaces 328, 330 of the intermediate hub 134 (as shown in FIGS. 14 and 15). The intermediate segment 120*b* may further include an external splined shaft 170 held centrally in the hollow tube 170 by one or more set screws, pins, or the like. The intermediate segment 120*b* may be symmetric about a transverse plane, so that the intermediate segment 120*b* may be mounted in either vertical orientation. The intermediate segment 120*b* may be substantially similar or identical to the intermediate segments 120*c*, 120*d*.

With continued reference to FIGS. 4-6, when the shaft 120 is assembled, the uppermost roller 110 may be secured to the flange 150 of the end segment 120*a* and to the upper flange 150*a* of the intermediate segment 120*b*. An adjacent roller 110 may be secured to the lower flange 150*b* of the intermediate segment 120*b* and to the upper flange 150*a* of the adjacent intermediate segment 120*c*. The remaining rollers 110 may be attached to the segments 120*a*-120*e* in like manner, with the lowermost roller 110 secured to the lower flange 150*b* of the intermediate segment 120*d* and to the flange 150 of the end segment 120*e*.

Figure 7:
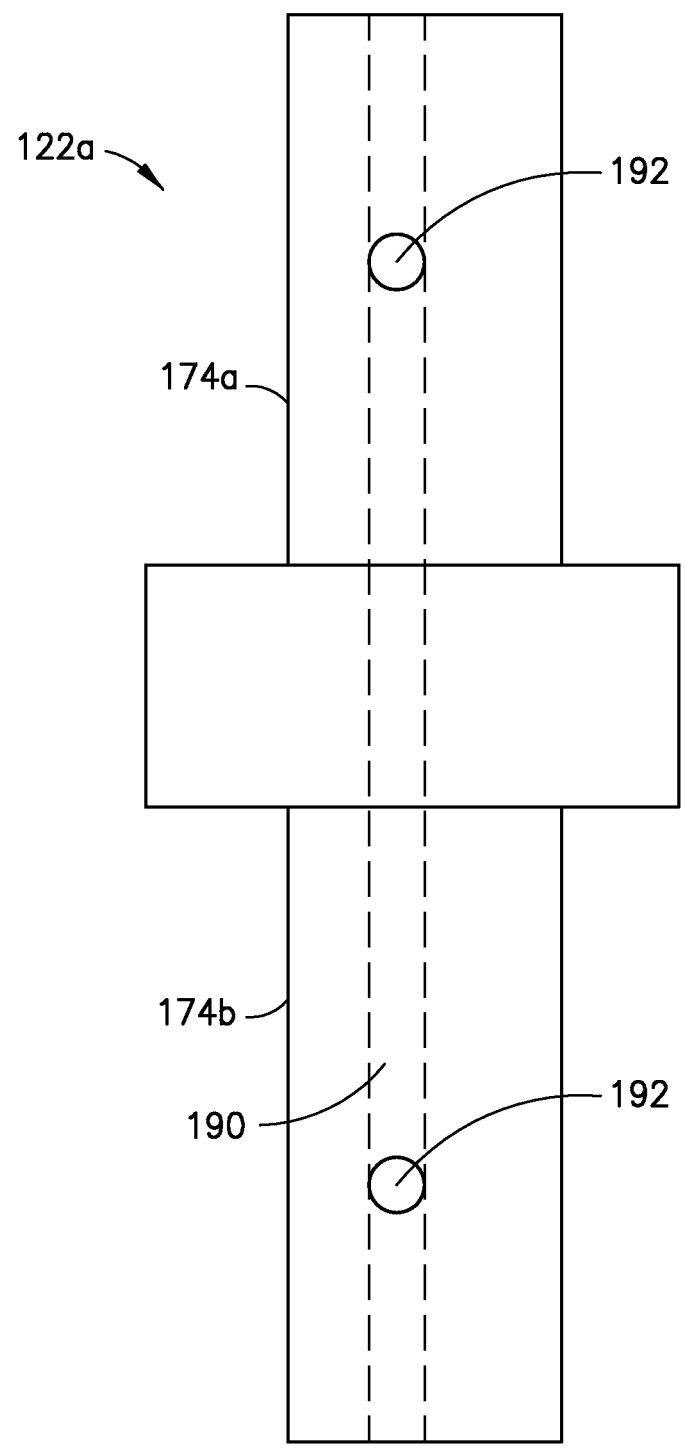
FIG. 7 is a schematic side view of a shaft connector of the roller assembly of FIG. 4.

Referring now to FIG. 7, shaft connector 122*a* is illustrated. The shaft connector 122*a* includes first and second connection portions 174*a*, 174*b* for connection to the adjacent segments 120*a*, 120*b* (see FIG. 4). Each of the first and second connection portions 174*a*, 174*b* may include an external splined surface, or another connection features as described herein. In particular, the first connection portion 174*a* may be configured for a slip fit engagement with the internal spline 128 of the end segment 120*a* (see FIG. 5), and the second connection portion 174*b* may be configured for a slip fit engagement with the internal spline 168 of the intermediate segment 120*b*. A bore 190 may extend the length of the shaft connector 122*a*, parallel to the longitudinal axis L, to allow pressurized air to pass through. The bore 190 may receive pressurized air from the end segment 120*a* (See FIG. 5). The bore 190 may be fluidly connected to an air orifice 192 on each of the first and second connection portions 174*a*, 174*b*. The air orifices 192 may be located to open within an internal cavity of the roller(s) 110 so that pressurized air from the bore 190 may flow into the roller(s) 110. The shaft connector 122*a* may be symmetric about a transverse plane, so that the shaft connector 122*a* may be mounted in either vertical orientation. The shaft connector 122*a* may be substantially similar or identical to the other shaft connectors 122*b*-122*d*.

Figure 8:
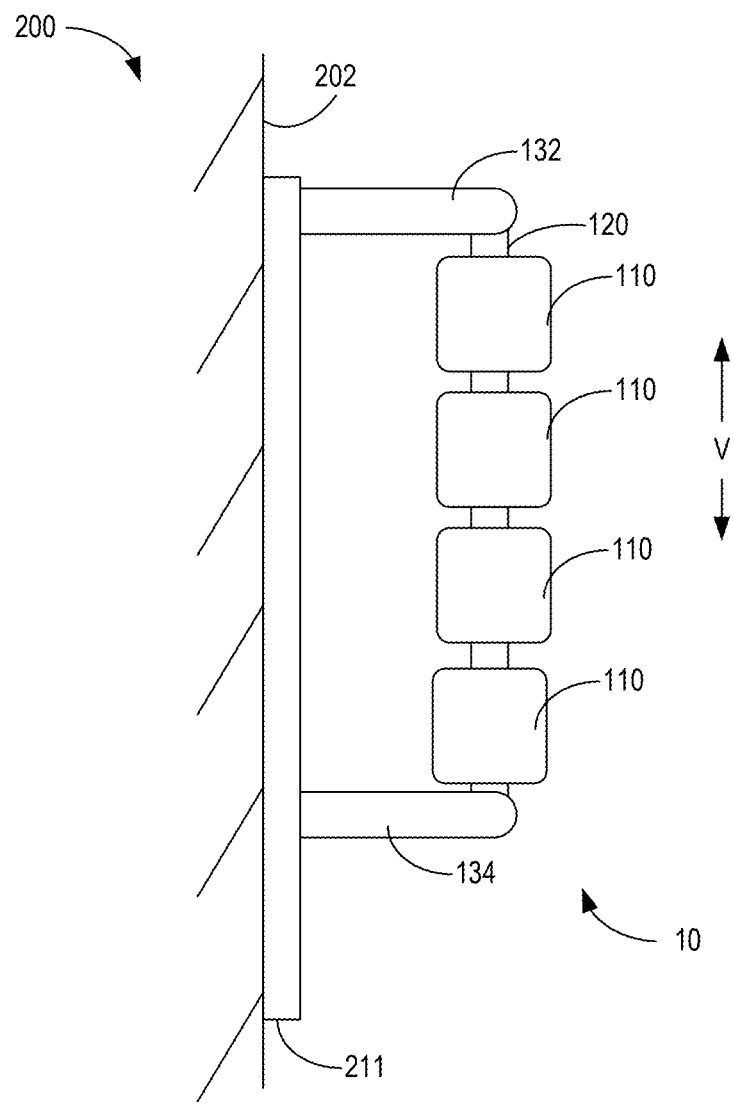
FIG. 8 is a side view of a roller assembly in accordance with embodiments of the present disclosure.

Referring now to FIG. 8, in some embodiments, the roller assembly 10 may be mounted vertically to the structure 200, such that the longitudinal axis L extends in a substantially vertical direction. A mounting surface 202 of the structure 200 may include a track 211 to which each of the brackets 132, 134 may be secured. The brackets 132, 134 may be adjustable along the track 211 in a direction V to adjust a position of the roller assembly 10 relative to the structure 200. In particular, the track 211 may define a finite or infinite number of positions to which the brackets 132, 134 may be connected. Adjustability of the brackets 132, 134 along the track 211 allows the roller assembly 10 to be set at a desired height suitable for an intended application. For example, it may be desirable to set the roller assembly 10 at a higher height when used in a cattle handling application, and at a lower height when used in a sheep handling application. In this manner, the roller assembly 10 may be vertically positioned at a height where livestock impacts are most likely to occur with a given species.

Figure 10:
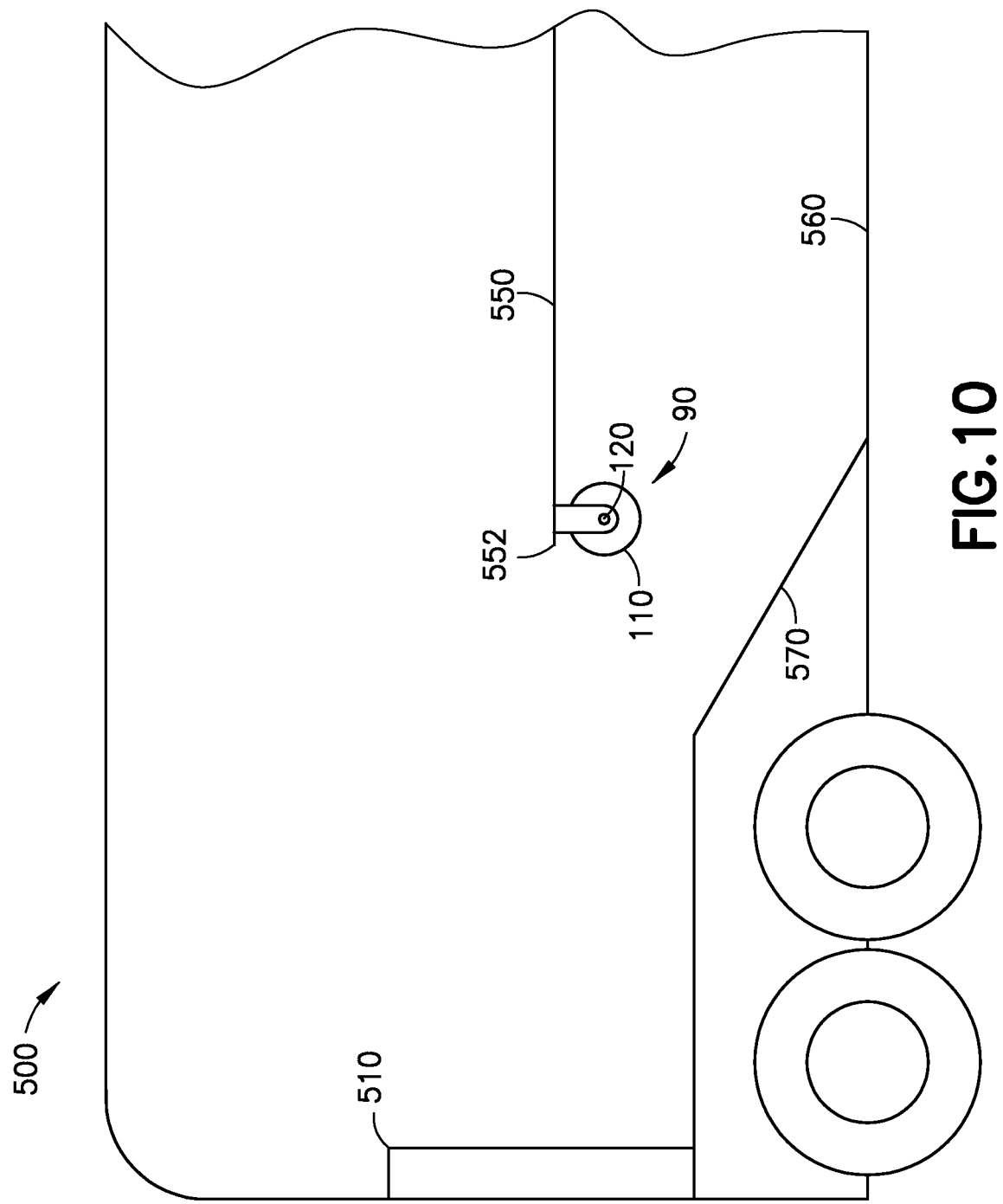
FIG. 10 is a side view of a livestock trailer in accordance with embodiments of the present disclosure.

Referring now to FIGS. 9 and 10, some embodiments of the present disclosure are directed to a trailer 500 for transporting livestock. The trailer 500 may include a door 510 through which livestock are moved into the interior of the trailer 500. A doorframe 512 of the door 510 may include vertical members 514 between which a passageway W (see FIG. 2) is defined. A roller assembly 10, which may be substantially in accordance with in any of the various embodiments described herein, may be mounted to each of the vertical members 514. As described in connection with FIGS. 2 and 3, the roller assemblies 10 may be mounted to the vertical members 514 such that the at least one roller 110 extends into or is tangent to the passageway W defined by the doorframe 512. As such, the roller assemblies 10 prevent animals being moved through the door 500 from impacting the doorframe 512, a common cause of tissue damage. As described herein in connection with FIG. 8, the doorframe 512 may include tracks 210 to which each of the roller assemblies 10 are mounted in order to facilitate height adjustment of the roller assemblies 10.

With continued reference to FIG. 10, in some embodiments, the trailer 500 may include an upper deck 550 and a lower deck 560. To access the lower deck 560, livestock must descend a ramp 570 after entering the trailer 500 through the door 510. An overhead roller assembly 90 may be attached to a terminal edge 552 of the upper deck 550 above the ramp 570 to prevent livestock from impacting the terminal edge 552. The overhead roller assembly 90 may be substantially identical to the roller assembly 10, but oriented horizontally.

Figure 11:
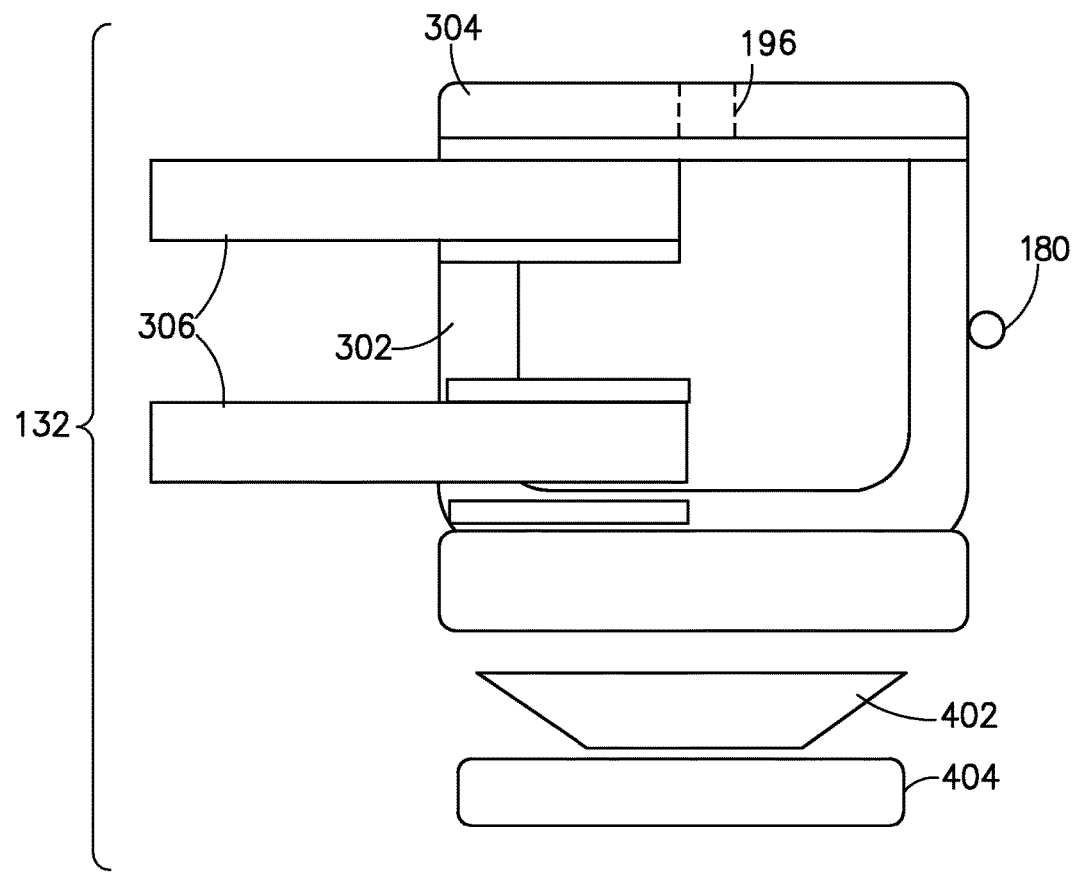
FIG. 11 is an exploded side view of an end bracket of the roller assembly of FIG. 4.
Figure 12:
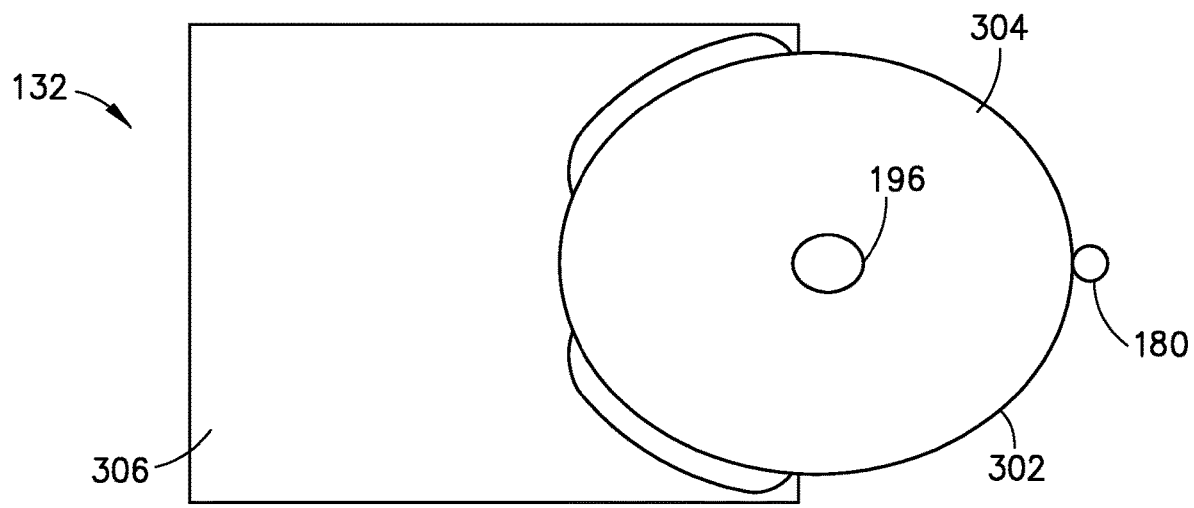
FIG. 12 is a top view of the end bracket of FIG. 11.
Figure 13:
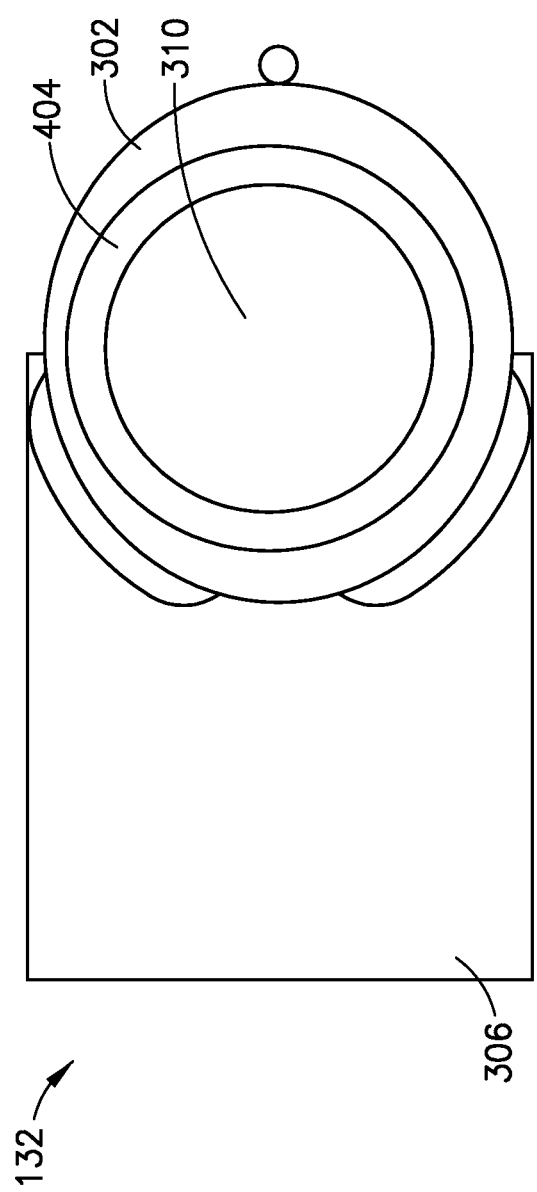
FIG. 13 is a bottom view of the end bracket of FIG. 11.

Referring now to FIGS. 11-13, an embodiment of the end bracket 132 is illustrated. The end bracket 132 includes a main body 302 formed of a hollow tube. The main body 302 defines an internal cavity 310 configured to receive an end of the shaft 120, for example the end segment 120a or 120e (see FIG. 4). One or more braces 306 extend from the main body 302, and are configured for mounting to the structure 200 (see, e.g. FIGS. 1 and 4) and/or the track 211 (see FIG. 8). The braces 306 may be of sufficient length that a gap between the roller 110 and the structure 200 is approximately 0.5 inches when the roller assembly 10 is installed. A bearing assembly, which may include a tapered bearing 402 and a corresponding bearing cup 404, are received in the main body 302 and mount to the shaft 120, allowing the shaft 120 to rotate with respect to the main body 302. An end cap 304 is secured (e.g. welded) to an end of the main body 302 opposite the bearing assembly. The end cap 304 defines an orifice 196 through which an air valve 140 (see FIG. 5) in the shaft 120 can be accessed to pressurize the rollers 110. A grease port 180 is defined in the main body 302 to facilitate lubrication of the bearing 402 and cup 404.

Referring now to FIGS. 14 and 15, an embodiment of the intermediate bracket 134 is illustrated. The intermediate bracket 134 is formed in two sections, namely a body 322 and a cap 324, that can be joined around the shaft 120. The body 322 includes a brace 326 that extends from the body 322, and is configured for mounting to the structure 200 (see, e.g. FIGS. 1 and 4) and/or the rail 210 (see FIG. 8). The brace 326 may be of sufficient length that a gap between the roller 110 and the structure 200 is approximately 0.5 inches when the roller assembly 10 is installed. The body 322 includes a bearing surface 328 configured to engage the shaft 120. The bearing surface 328 may be a plain bearing, half of a split bearing, or the like. The cap 324 is configured to removably connect to the body 322 to capture the shaft 120, for example using bolts. The cap 324 includes a bearing surface 330 complementary to the bearing surface 328 of the base 322. With the cap 324 connected to the body 322, the complementary bearing surfaces 328, 330 retain and facilitate rotation of the shaft 120. If a portion of the shaft 120 is to be replaced or services, the cap 324 may be removed from the body 322 allowing the shaft 120 to be removed. At least one grease port 182 is defined in the body 322 and/or the cap 324 to facilitate lubrication of the bearing surfaces 328, 330.

While the embodiments described herein have been discussed primarily in the context of livestock handling, it is to be understood that the devices and systems described may also be used in other fields. For example, the roller assembly 10, 90 may be used in the produce industry to guide produce (e.g. fruits and vegetables) along various conveying and transport systems to prevent tissue damage from impacts. Similarly, the roller assembly 10, 90 may be used in human crowd control systems, for example, at concerts or other large gatherings. In some embodiments, the roller assembly 10 may be mounted to an emergency exit door in the rear of a school bus in a similar manner to how the roller assembly 10 is mounted to the door of a livestock trailer.

While several embodiments of the present disclosure are shown in the accompanying figures and described hereinabove in detail, other embodiments will be apparent to, and readily made by, those skilled in the art without departing from the scope and spirit of the invention. For example, it is to be understood that this disclosure contemplates, to the extent possible, that one or more features of any embodiment can be combined with one or more features of any other embodiment. Accordingly, the foregoing description is intended to be illustrative rather than restrictive.

What is claimed is:

1. A roller assembly for preventing bruising in livestock, the assembly comprising:
   a central shaft having a longitudinal axis;
   a plurality of resilient rollers rotatable about the longitudinal axis, wherein the longitudinal axis extends through a portion of each of the resilient rollers and each of the resilient rollers comprises a pneumatic bladder;
   an end bracket connected to a first end of the central shaft; and
   an intermediate bracket connected to the central shaft between two of the resilient rollers,
   a bore extending parallel to the longitudinal axis, the bore configured to be fluidly connected to each of the plurality of pneumatic bladders;
   wherein the end bracket extends from the central shaft and is configured for attachment to a structure such that the plurality of resilient rollers extends into or is tangent to a passageway defined by the structure.

2. The roller assembly of claim 1, wherein each of the pneumatic bladders is mounted to at least one flange connected to the central shaft.

3. The roller assembly of claim 1, wherein the plurality of resilient rollers are rotationally locked relative to one another so as to rotate in unison.

4. The roller assembly of claim 1, wherein the central shaft comprises a plurality of segments, each of the plurality of segments connected to at least one of the plurality of resilient rollers.

5. The roller assembly of claim 4, wherein each of the plurality of segments comprises an interface for reversibly attaching to an adjacent segment.

6. The roller assembly of claim 5, wherein the interface comprises at least one of a spline, a key, and a keyway.

7. The roller assembly of claim 1, wherein the longitudinal axis extends substantially vertically.

8. A system for moving or transporting livestock, the system comprising:
a structure comprising a mounting surface; and
a roller assembly configured for preventing impact of livestock with the structure, the roller assembly comprising:
a central shaft having a longitudinal axis;
at least two resilient rollers rotatable about the longitudinal axis, wherein the longitudinal axis extends through a portion of the at least two resilient rollers, and each of the at least two resilient rollers comprises a pneumatic bladder;
a bore extending parallel to the longitudinal axis, the bore configured to be fluidly connected to each of the plurality of pneumatic bladders;
an end bracket connected to a first end of the central shaft; and
an intermediate bracket connected to the central shaft between two of the at least two resilient rollers,
wherein the end bracket extends from the central shaft and is configured for attachment to a structure such that the at least two resilient rollers extends into or is tangent to a passageway defined by the structure.

9. The system of claim 8, wherein the mounting surface comprises a track, and
wherein a bracket assembly is adjustable along the track to adjust a position of the roller assembly relative to the structure.

10. The system of claim 8, wherein the at least two resilient rollers are rotationally locked relative to one another so as to rotate in unison.

11. The system of claim 8, wherein the central shaft comprises a plurality of segments, each of the plurality of segments connected to at least one of the at least two resilient rollers.

12. A trailer for transporting livestock, the trailer comprising:
a doorframe; and
a doorframe roller assembly configured for preventing impact of livestock with the doorframe, the doorframe roller assembly comprising:
a central shaft having a longitudinal axis;
at least two resilient rollers rotatable about the longitudinal axis, wherein the longitudinal axis extends through a portion of each of the resilient rollers, and each of the at least two resilient rollers comprises a pneumatic bladder;
a bore extending parallel to the longitudinal axis, the bore configured to be fluidly connected to each of the plurality of pneumatic bladders; and
an end bracket connected to a first end of the central shaft,
wherein the end bracket extends from the central shaft and is attached to the doorframe such that the at least two resilient rollers extends into or is tangent to a passageway defined by the doorframe.

13. The trailer of claim 12, further comprising:
a horizontal member;
an overhead roller assembly configured for preventing impact of livestock with the horizontal member, the overhead roller assembly comprising:
a central overhead roller shaft having an overhead roller longitudinal axis;
at least one resilient overhead roller rotatable about the overhead roller longitudinal axis; and
an end bracket connected to a first end of the central overhead roller shaft,
wherein the end bracket extends from the central overhead roller shaft and is attached to the horizontal member such that the at least one resilient overhead roller extends into or is tangent to a passageway defined by the horizontal member.

14. The trailer of claim 12, wherein the at least two resilient rollers are rotationally locked relative to one another so as to rotate in unison.

* * * * *